May 11, 1965

E. E. CRILE ETAL 3,182,818

PALLET MAGAZINE LOADING DEVICE FOR CONCRETE
BLOCK PRODUCING MACHINES

Filed July 11, 1961

INVENTOR.
EUGENE E. CRILE
WILLIAM R. THOMAS
CHARLES W. WARMKESSEL

BY *Wm. H. Dean*

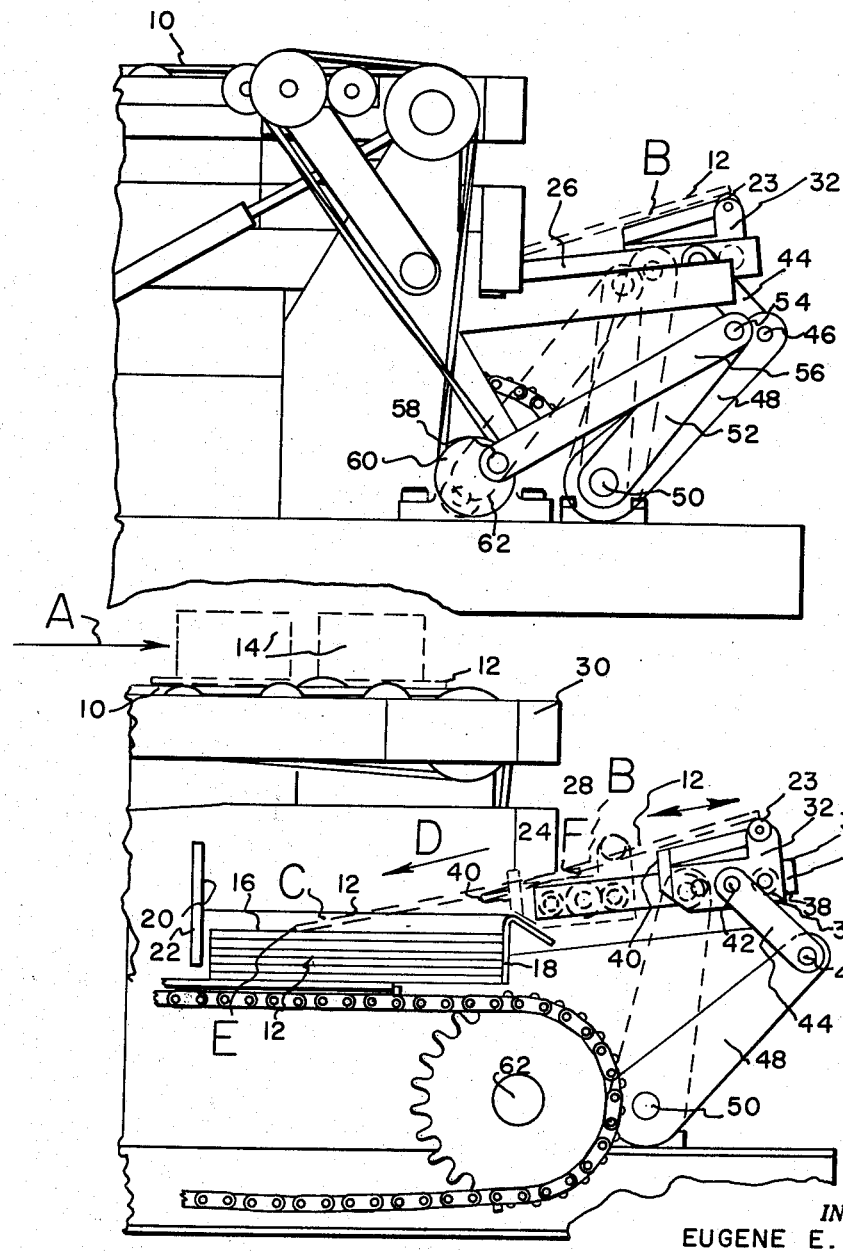

May 11, 1965

E. E. CRILE ETAL 3,182,818

PALLET MAGAZINE LOADING DEVICE FOR CONCRETE
BLOCK PRODUCING MACHINES

Filed July 11, 1961

INVENTOR.
EUGENE E. CRILE
WILLIAM R. THOMAS
CHARLES W. WARMKESSEL

Wm. H. Dean

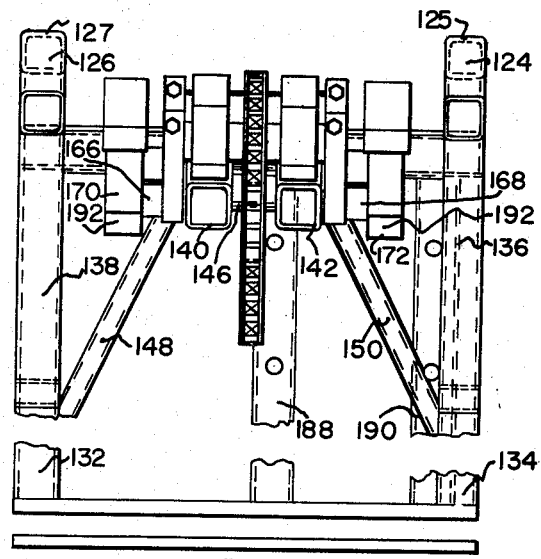
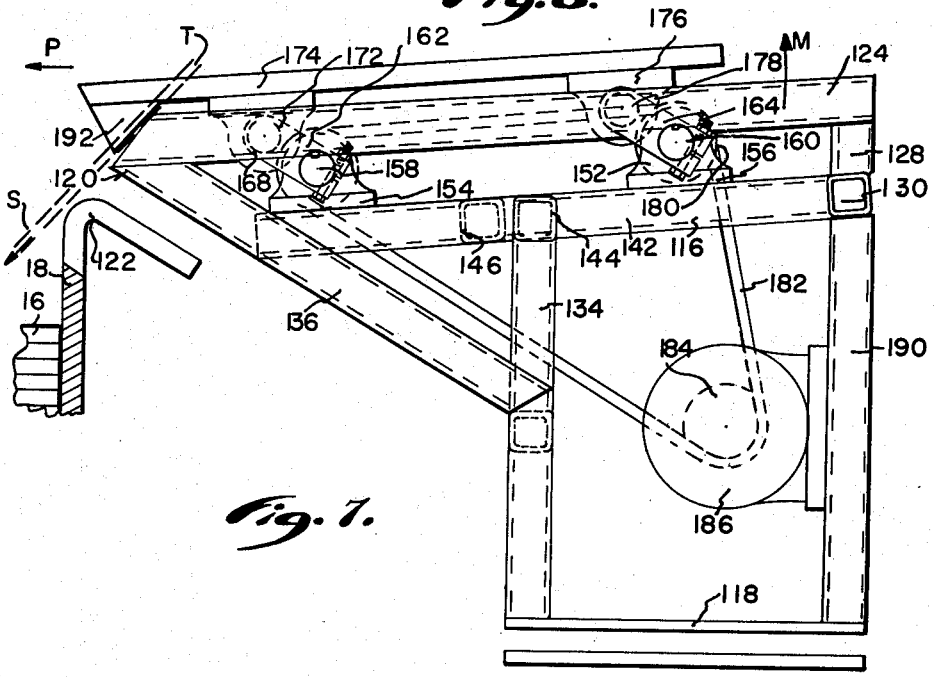

3,182,818
PALLET MAGAZINE LOADING DEVICE FOR CONCRETE BLOCK PRODUCING MACHINES
Eugene E. Crile, 1619 W. Marlette, William R. Thomas, 1109 W. Vista Ave., and Charles W. Warmkessel, 6242 N. 17th Ave., all of Phoenix, Ariz.
Filed July 11, 1961, Ser. No. 123,178
1 Claim. (Cl. 214—6)

This invention relates to a pallet magazine loading device for concrete block machines and more particularly to a device for loading pallets into magazines of conventional concrete block machines, such as the well known "Besser" machine.

Concrete block machines deliver formed concrete blocks on pallets and these pallets carrying the blocks are transferred from the machine to racks and unladen or empty pallets are transferred from the racks to the magazine of the machine, so that the machine will continuously be supplied with pallets on which to deliver freshly formed concrete blocks.

The rate at which the magazine of the machine receives empty pallets is substantially equal to the rate at which the machine delivers pallets on which freshly formed blocks are carried.

In conventional concrete block machine installations, a manually operable offbearing machine is usually employed and some of these manual offbearers utilize magnetic pick ups which pick up pallets from racks after laden pallets are delivered to such racks, whereupon the unladen pallets are subsequently manually released into the machine which is generally located below the delivery conveyor of the machine, on which laden pallets are delivered.

Heretofore, the empty pallets, which have been delivered to the magazine of the machine, have not always been deposited directly into the magazine, but have been deposited in such a manner that they slide laterally into the magazine. Under these conditions, the pallets often times do not slide all the way into the magazine, whereby one edge of the pallet projects upwardly at an angle outwardly of the magazine and the operator of the offbearing equipment has previously forced the pallet on into the magazine by kicking it with the heel of his shoe. This manual magazine loading operation has been costly of labor and has required constant attention of the operator of the conventional manually controlled offbearing machines.

Accordingly, some concrete block machines have been provided with conveyor belt-type magazine loaders, which receive the empty pallets returned to the machine and which tend to force the pallets into the magazine. These belt-type conveyor magazine loaders have often times failed to force the pallets into the magazines. For example, an edge of a pallet sometimes catches on the upper surface of a stack of pallets in the magazine and the belts slide under the stuck pallet whereupon the next pallet delivered by the belt toward the magazine slides under the angularly and upwardly extending edge of the stuck pallet, thereby jamming the magazine feed.

Such belt-type conveyor magazine feeding devices have been lacking in reliability and, due to this fact, a more positive magazine loading device has been needed.

With the advent of automatic offbearing machines, it has been necessary to provide a positive device for loading the pallet magazines of concrete block producing machines. For example, an automatic offbearing machine receives block laden pallets from the delivery conveyor of the machine and transfers these block laden pallets to a rack and concurrently picks up pallets from a rack and returns them back to the magazine of the machine. When the empty pallets are returned to the magazine of the machine, they are dropped on a slight incline so that they tend to slide laterally edge-wise and downwardly into the magazine. With the operation of such automatic offbearing machines, a positive magazine loading device is absolutely necessary since any jamming of the magazine will cause considerable difficulty and will eventually stop operation of the entire concrete block producing machine, including the automatic offbearing machine.

Accordingly, it is an object of the present invention to provide a very positive and reliable pallet magazine loading device for concrete block producing machines.

Another object of the invention is to provide a pallet magazine loading device for concrete block producing machines, wherein, a positive reciprocating mechanism is adapted intermittently to traverse an area adjacent one side of a pallet magazine and positively to engage edges of pallets being returned to the magazine, whereby pallets tending to stick on an incline relative to the uppermost pallets in the magazine, are positively forced into proper position above and upon the stack of pallets in the magazine.

Another object of the invention is to provide a pallet magazine loading device for concrete block producing machines, employing a constantly cycling reciprocatory mechanism having a portion which is intermittently forced toward the side of the magazine and disposed to engage edges of a pallet so that they are positively forced over the edge of the magazine into a position wherein they will fall into a horizontally disposed flat stack.

Another object of the invention is to provide a pallet magazine loading device for concrete block producing machines comprising a reciprocatory mechanism which is constantly cycled by means connected with a moving part of a concrete block producing machine, whereby reciprocatory action of the mechanism cycles constantly, and often enough, to engage edges of pallets and force them beyond the edge of a magazine and fully thereinto.

Another object of the invention is to provide a pallet magazine loading device for concrete block producing machines comprising a reciprocatory mechanism operated independently of a respective concrete block producing machine.

Another object of the invention is to provide a pallet magazine loading device for concrete block producing machines wherein a reciprocatory mechanism may be powered by any suitable means independently of a concrete block producing machine.

Another object of the invention is to provide a pallet magazine loading device for concrete block producing machines comprising various modified structures, one of which includes reciprocating elevator mechanism, which cycles intermittently to pick up empty pallets and carry them toward a pallet magazine, whereupon an edge of the elevator mechanism may subsequently positively engage an edge of a pallet and force it fully into the pallet magazine of the machine.

Further objects and advantages of the invention may be apparent from the following specification, appended claim, and accompanying drawings, in which:

FIG. 2 is a fragmentary side elevational view taken from the line 2—2 of FIG. 1;

FIG. 3 is a fragmentary sectional view taken from the line 3—3 of FIG. 1;

FIG. 7 is a side elevational view of an additional modification of the invention; and FIG. 8 is an end view of the modified structure shown in FIG. 7.

Figure 1:
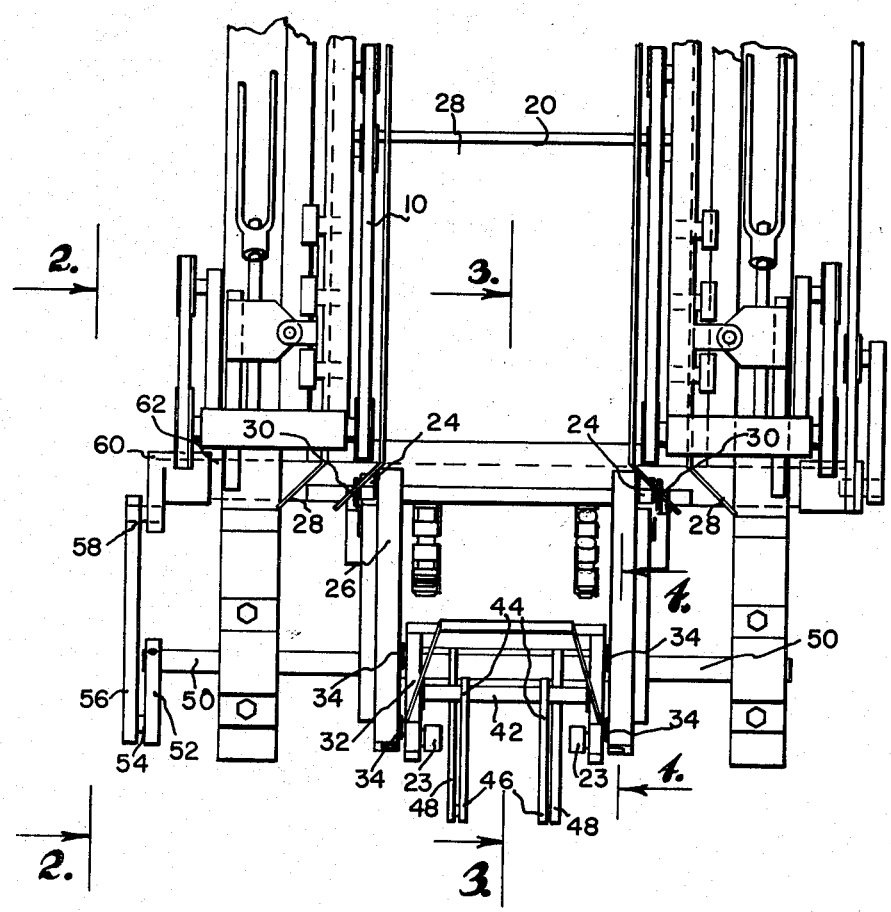
FIG. 1 is a fragmentary top or plan view of the delivery end of a concrete block producing machine showing a pallet magazine loading device therefor, in connection therewith, and in accordance with the present invention.

As shown in FIGS. 1 and 2 of the drawings, a conventional concrete block machine, such as a conventional "Besser" machine, or the like, is provided with a delivery conveyor 10 composed of belts and sheaves, which are conventional to such machines.

This delivery conveyor 10, as shown in FIG. 3 of the drawings, is disposed to carry laden pallets, as indicated by broken lines 12, on which freshly formed concrete blocks are carried, as indicated by broken lines 14. The laden pallet 12 and concrete blocks 14 are delivered on a conveyor 10 in a direction of the arrow A, as shown in FIG. 3 of the drawings.

When these block laden pallets 12 are removed from the conveyor 10 and placed in racks for curing of the blocks, unladen or empty pallets are removed from the racks and placed or dropped in a position B, as indicated in FIG. 3 of the drawings. These empty pallets 12, in the position B, are slidably moved to a position C, in a direction of the arrow D, whereupon these empty pallets are forced into a position on the top of a stack 16 of empty pallets 12, between walls 18 and 20, of the pallet magazine 22, of a conventional concrete block producing machine.

It will be seen that the magazine 22 is disposed below the delivery conveyor 10 and that the pallets, as indicated by broken lines B and C, must be slidably deposited in the magazine 22, whereby a leading edge E, of each pallet, in a position indicated by the broken lines C, scrapes the upper surface of an uppermost pallet at the uppermost surface 16 of the stack of pallets in the magazine 22. As the forward edge E scrapes the uppermost surface 16, friction, at this edge E, tends to prevent the respective pallet from moving from the angular position C into the magazine and into horizontal position on the upper surface 16 of the stack of pallets 12.

In accordance with the present invention, the pallets 12 are received as indicated by a broken line position B and in this position, the pallets are supported on rollers 23 and 24 which tend to permit a rolling support for the pallet so that it moves by gravity to the broken line position C, in FIG. 3 of the drawings. The rollers 24 are stationarily supported on stationary channel tracks 26 and these channel tracks 26 are located between inwardly converging guides 28, and between which, the pallets are dropped onto the rollers 23 and 24. Inwardly converging guides 30 are disposed above the guides 28 and provide for the guidance of an automatic offbearing machine, into alignment with the delivery conveyor 10, of the concrete block producing machine.

Figure 4:
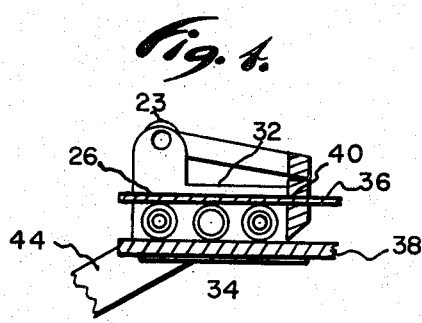
FIG. 4 is a fragmentary sectional view taken from the line 4—4 of FIG. 1.

The rollers 23 are supported on a movable carriage 32, which traverses the channel tracks 26 in a reciprocatory fashion, as will be hereinafter described. The carriage 32 is provided with cantilever mounted rollers 34, which are disposed internally of the upper and lower flanges 36 and 38 of the channel tracks 26, all as shown best in FIGS. 1 and 4 of the drawings. Thus, the carriage 32 is mounted to roll on rollers 34 in the channel tracks 26, which are stationarily mounted in a slightly inclined disposition, as shown best in FIG. 3 of the drawings.

The carriage 32 is provided with a pallet engaging surface 40 which is disposed to engage an edge F of a pallet in a position as indicated by broken lines C and to force the pallet completely into a position between the walls 18 and 20, of the pallet magazine 22.

Pivotally connected with the carriage 32, by means of a shaft 42, are links 44, the opposite ends of which are pivotally connected to pins 46. Levers 48, at their normally upper ends, are connected to the pins 46 and the normally lower ends of these levers 48 are fixed to a shaft 50.

Also fixed to the shaft 50 is another lever 52 having its normally upper end connected by a pin 54 to a normally upper end of a link 56. The opposite end of this link 56 is pivotally mounted on a trunnion 58 of a crank member 60, carried by a shaft 62 which is a driven shaft forming part of a conventional concrete block manufacturing machine. This particular shaft 62 is conventional to the well known "Besser" machines.

During operation of the concrete block producing machine the shaft 62 rotates and causes the link 56 to pivot into and out of the broken line position, shown in FIG. 2 of the drawings. This action causes pivotal movement of the shaft 50, levers 52 and 48, thereby actuating and causing corresponding reciprocatory movement of the carriage 32, longitudinally of the tracks 26, all as indicated by broken lines in FIGS. 2 and 3 of the drawings.

As the carriage 32 moves to a broken line position, shown in FIG. 3 of the drawings, its surface 40, hereinbefore described, reaches a position which substantially coincides with the inner surface of the wall 18, of the magazine 22, whereby a pallet engaged by this surface 40 will be forced completely into the magazine 22 so that it takes a position horizontally on the upper surface 16 of the stack of pallets 12 in the magazine.

Each time the shaft 62 rotates, the carriage 32 is thus cycled reciprocally longitudinally of the tracks 26, so that the surface 40 thereof, will automatically engage an edge F of a pallet in a position C and completely force the pallet into the magazine 22.

It will be appreciated by those skilled in the art that the pallet magazine loading device for concrete block producing machines of the invention operates constantly during operation of said machine, so that pallets are continuously and positively loaded into the magazine 22 as they are deposited by the offbearing machine, on the rollers 23 and 24, as hereinbefore described.

Figure 5:
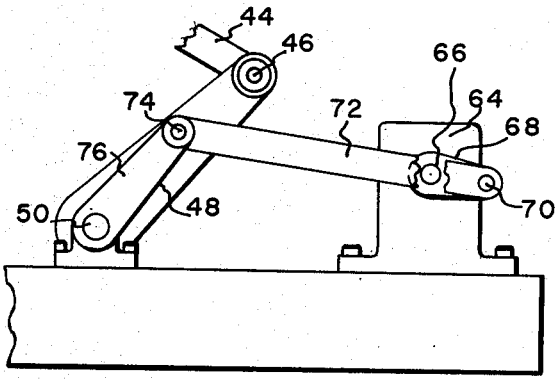
FIG. 5 is a fragmentary sectional view of a modified actuating and power means for a pallet magazine loading device for concrete block machines, in accordance with the invention.

In the modification of the invention, as shown in FIG. 5 of the drawings, a motor 64 is disposed to supply motive power for the pallet magazine loading device of the invention, without relying on motive power delivered by the shaft 62 of the concrete block machine. Thus, the pallet magazine loading device of the invention may be operated independently of the machine, in accordance with the modification, shown in FIG. 5.

The motor 64 is provided with a shaft 66 to which a bell crank 68 is secured. This bell crank 68 carries a pin 70 to which one end of a link 72 is pivotally connected. The opposite end of this link 72 is pivotally connected by means of a pin 74 with a lever 76. This lever 76 is similar to the hereinbefore described lever 52. The lever 76 is connected to the shaft 50, as hereinbefore described, and mounted on this shaft are levers 48, similar to those as shown in FIGS. 1 and 2 of the drawings. Thus, the motor 64 may be substituted for the drive provided by the shaft 62, as hereinbefore described.

The links 44 pivotally connect the levers 48, to the carriage 32, in a manner similar to that hereinbefore described in connection with the structures shown in FIG. 3 of the drawings.

Figure 6:
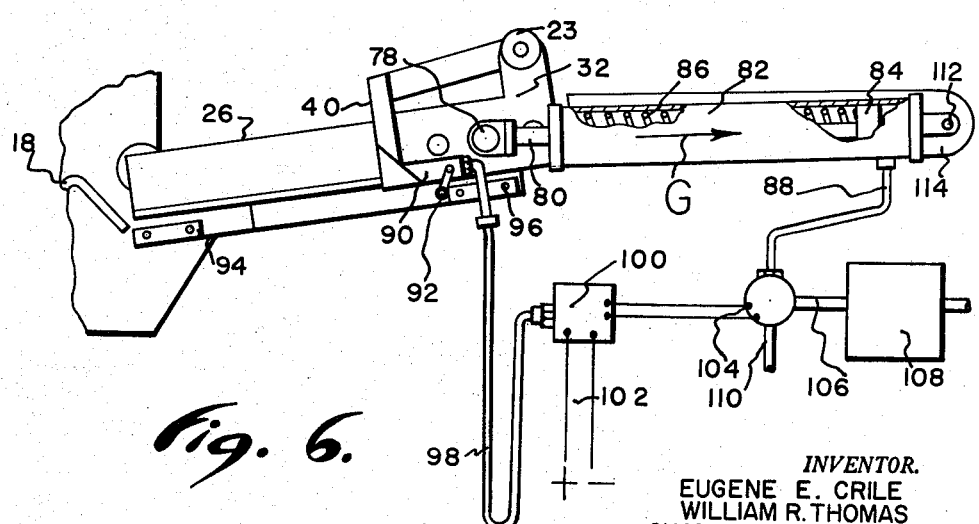
FIG. 6 is a fragmentary side elevational view of a further modified actuating and power means for a pallet magazine loading device for concrete block machines, in accordance with the invention.

In the modification, as shown in FIG. 6 of the drawings, the carriage 32 is reciprocally mounted in tracks 26, similar to that as shown in FIGS. 1, 2 and 3 of the drawings. Pivotally connected to the carriage 32, by means of a pin 78, is a plunger 80, of a pressure fluid operated cylinder 82. The plunger 80 is provided with a piston 84 engaged by a spring 86 tending to retract the piston in the direction of an arrow G. A pressure fluid conduit 88 communicates with the opposite side of the piston 84 through the side wall of the cylinder 82 to furnish pressure fluid to said opposite side of the piston 84, in order to project the plunger 80 from the cylinder 82 and to move the carriage 32 into a position similar to the broken line position, shown in FIG. 3 of the drawings.

Mounted on the side of the carriage 32 is a limit switch 90 having a pivoted lever 92 alternately engageable with blocks 94 and 96 fixed to the channel tracks 26.

Coupled to the switch 90 is a flexible conductor 98 electrically connected to a relay 100 which delivers electrical energy from a line source 102, to a solenoid valve 104.

Communicating with the solenoid valve 104, via a conduit 106, is a pressure fluid accumulator 108.

In operation, the switch 90, when in the solid line position shown in FIG. 6 of the drawings, is closed by contact of its lever 92 with the block 96, which energizes the relay 100 and causes the solenoid valve 104 to open and conduct pressure fluid from the accumulator 108 through the conduit 106 and to a side of the piston 84, tending to project the plunger 80 toward the wall 18, of the pallet magazine 22.

When the surface 40 of the carriage 32 reaches a position similar to that shown by broken lines in FIG. 3 of the drawings, the arm 92 of the switch 90 contacts the block 94 and reverses operation of the solenoid valve 104, so that the spring 86 may retract the plunger 80 and the carriage 22, and whereby, pressure fluid in the cylinder is exhausted through a conduit 110 communicating with the solenoid valve 104. The fluid is then transferred to a pump, not shown, and replaced in the accumulator 108.

The cylinder 82, in communication with the conduit 88, is provided with conventional restricting orifice means to control the fluid flow rate into and out of the cylinder 82 and corresponding projection and retraction rates of the plunger 80, as it is caused to reciprocate alternately by contact of the arm 92 of the switch 90, with the blocks 94 and 96.

It will be seen that the cylinder 82 is pivotally mounted on a stationary pin 112 and is permitted to pivot, with respect to a frame element 114, extended from the channel tracks 26.

In the modification of the invention, as shown in FIG. 7 of the drawings, a frame 116 is provided with a base 118, which supports a portion 120 of the frame 116 in overhanging relationship with an edge 122 of one side 18, of a concrete block machine pallet magazine, similar to that as shown in FIG. 3 of the drawings.

The frame 116 is provided with upper frame rails 124 and 126 at opposite sides thereof, on which empty pallets may be deposited. These rails 124 and 126, at the rear of the frame, are supported by vertical members 128, which are interconnected by a horizontal member 130. Additional legs 132 and 134 are connected to inclined braces 136 and 138, which at their upper ends, are welded, or otherwise secured, to the frame members 124 and 126. Bearing supporting members 140 and 142 are disposed between the frames 124 and 126 and are fixed to the frame members 130 and a cross member 144. A spacer 146 is disposed between the frame members 140 and 142 and angled braces 148 and 150 interconnect the legs 132 and 134 and the frame members 140 and 142, respectively.

Bearings 152 and 154 are bolted onto the frame members 140 and 142, respectively, and also similar bearings 156 are bolted to the frame members 140 and 142. These bearings support shafts 158 and 160, on which bell cranks 162 and 164 are mounted. These bell cranks 162 and 164 have outwardly extending trunnions, which are similar in construction. The bell cranks 162 and 164 are similar in construction to bell cranks on the opposite ends of the shafts 158 and 160. The bell cranks, on the opposite ends of the shaft 158, for example, are provided with trunnions 166 and 168, which carry bearings 170 and 172, respectively, which are fixed to the lower side of a pallet loading carriage 174. Likewise, bearings 176 are disposed on trunnions 178 carried by bell cranks 164, on opposite ends of the shaft 160.

Mounted on the shaft 160 is sprocket 180 engaged by a chain 182, driven by sprocket 184, on a shaft of a motor 186, which is mounted on motor mount legs 188 and 190, at the receiving end of the frame 116. The chain 182 also engages a sprocket 183 on the shaft 158.

It will be understood that the motor 186 is a slow speed gear reduction motor which rotates the shaft 160 at a slow rate and moves the carriage 174 by means of the bell cranks 174 in an arcuate path about the axes of the shafts 158 and 160 and through arcs described by the centers of the trunnions 172 and 178, shown in FIG. 7 of the drawings. The carriage 174 thus operates as an elevator, since it moves in a direction of the arrow P, when moving in a counter-clockwise direction about the axes of the shafts 158 and 160, and then the carriage 174 rises in an elevating fashion, in a direction of the arrow M, in FIG. 7 of the drawings. Thus, the carriage 174 rises under pallets dropped on the upper surfaces 125 and 127, of the frame members 124 and 126, respectively, and as the carriage pivots, it pivots forward in a direction of an arrow R, thus carrying the pallet toward a magazine 22.

In the event, the pallet stops in a broken line position S, its edge T will be engaged by inclined surfaces 192 and 194, of blocks 196 and 198, at the forward portion of the carriage 174. When the edge T of a pallet, in the position S, is engaged by the inclined edge 192 and the inclined edge 194, of the blocks 196 and 198, respectively, the pallet is forced beyond the inner side wall 18, of the magazine 22, and is thus, completely deposited therein in a flat horizontal disposition, on the upper surface 16 of the stack of pallets in the magazine.

Rotation of the shafts 158 and 160 cause the carriage 174, alternately to be lowered and elevated, and when elevated, to pick up pallets and carry them toward the magazine 22, and when the pallets fail completely to slide into the magazine 22, the inclined portions 192 and 194, as hereinbefore described, positively engage the edges of such pallets and force them completely into the magazine 22.

It will be obvious to those skilled in the art that various modifications of the present invention may be resorted to in a manner limited only by a just interpretation of the following claim.

We claim:

In a pallet magazine loading device for concrete block machines, the combination of: a magazine having upstanding sides disposed to contain a stack of pallets; and power operated means disposed to move back and forth, toward said magazine to force pallets thereinto said magazine disposed below said power operated means; said means comprising a pallet carriage disposed to receive pallets thereon; a frame; bell crank means having a substantially horizontal axis and pivoted on said frame; and said bell crank means pivotally supporting said carriage thereon; a shaft connected to said bell crank means for pivotally actuating said carriage about said horizontal axes; whereby said pallet carriage is intermittently elevated, moved toward said magazine and then lowered as said shaft is rotated said power operated means disposed to rotate said shaft; and a surface portion at one end of said carriage adjacent said magazine; said surface disposed to engage edges of pallets positively to force them into said magazine.

References Cited by the Examiner

UNITED STATES PATENTS

| | | | |
|---|---|---|---|
| 2,130,171 | 9/38 | Zsamboky | 214—6 |
| 2,741,371 | 4/56 | Oswalt | 214—16.42 X |
| 2,792,950 | 5/57 | Fenton | 214—6.2 |
| 2,866,562 | 12/58 | Raack et al. | 214—6 |

FOREIGN PATENTS

| | | |
|---|---|---|
| 1,002,247 | 2/57 | Germany. |
| 1,005,904 | 4/57 | Germany. |
| 1,093,294 | 11/60 | Germany. |

HUGO O. SCHULZ, *Primary Examiner.*

GERALD M. FORLENZA, MORRIS TEMIN,
*Examiners.*